United States Patent
Reed et al.

(10) Patent No.: US 7,152,724 B2
(45) Date of Patent: Dec. 26, 2006

(54) HYBRID ELECTRO-MECHANICAL TRANSMISSION PARK SYSTEM ACCESS COVER AND METHOD

(75) Inventors: William S. Reed, Greenfield, IN (US); James A. Raszkowski, Indianapolis, IN (US); Joel E. Mowatt, Zionsville, IN (US); Bert D. Love, Brownsburg, IN (US); Rick K. Daugherty, Clayton, IN (US)

(73) Assignee: General Motors Corporation, Detroit, MI (US)

( * ) Notice: Subject to any disclaimer, the term of this patent is extended or adjusted under 35 U.S.C. 154(b) by 159 days.

(21) Appl. No.: 11/049,626

(22) Filed: Feb. 2, 2005

(65) Prior Publication Data

US 2005/0205385 A1    Sep. 22, 2005

Related U.S. Application Data

(60) Provisional application No. 60/555,141, filed on Mar. 22, 2004.

(51) Int. Cl.
*F16H 57/02* (2006.01)
*F16H 57/10* (2006.01)

(52) U.S. Cl. ............... 192/219.5; 74/411.5; 74/606 R; 29/402.03; 29/428

(58) Field of Classification Search .............. 192/219.5
See application file for complete search history.

(56) References Cited

U.S. PATENT DOCUMENTS

| | | | | |
|---|---|---|---|---|
| 3,729,075 A | * | 4/1973 | Piret | 192/219.5 |
| 4,126,201 A | * | 11/1978 | Stevens | 180/344 |
| 5,531,303 A | * | 7/1996 | Raszkowski | 192/219.5 |
| 6,358,173 B1 | * | 3/2002 | Klemen et al. | 475/5 |
| 2005/0205383 A1 | * | 9/2005 | Reed et al. | 192/219.5 |
| 2005/0205384 A1 | * | 9/2005 | Reed et al. | 192/219.5 |

FOREIGN PATENT DOCUMENTS

JP       03200458 A   *   9/1991

* cited by examiner

*Primary Examiner*—Richard M. Lorence
(74) *Attorney, Agent, or Firm*—Dan L. Thompson

(57) ABSTRACT

This invention relates to the housing of a hybrid electro-mechanical transmission consisting of park pawl system located in the end cover portion of the transmission housing. The end cover portion is configured to cover the park pawl system and allow access to the components of the park pawl system for assembly or service even as the end cover portion remains attached to the main housing of the transmission. An access cover and seal for the access opening in the end cover portion is also provided. The access opening is designed to be small enough so that the end cover portion can also provides structural support to a main housing portion during operation of the transmission. A method of selectively providing access to a park pawl system located in the end cover portion of a transmission housing is also provided.

17 Claims, 2 Drawing Sheets

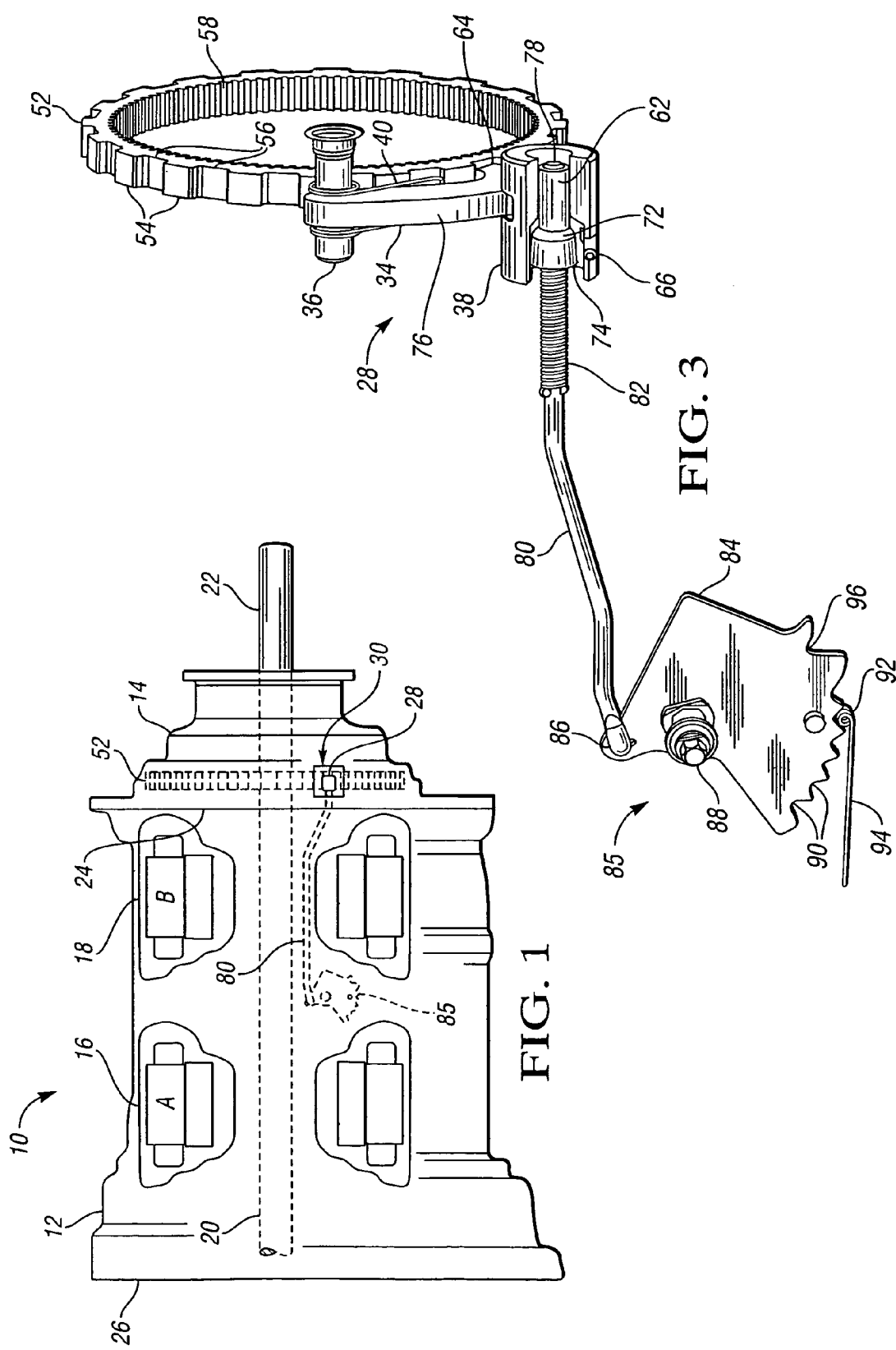

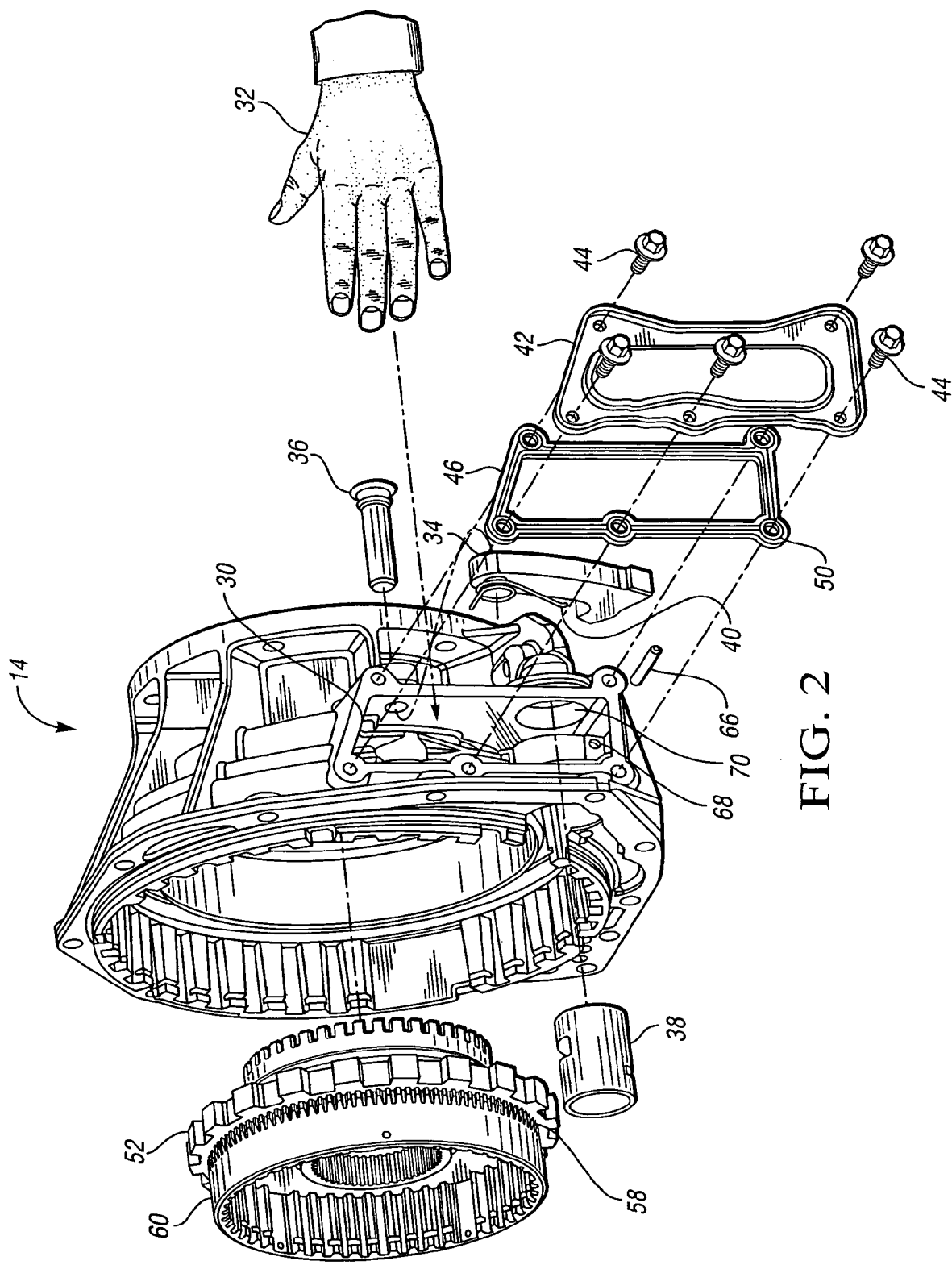

HYBRID ELECTRO-MECHANICAL TRANSMISSION PARK SYSTEM ACCESS COVER AND METHOD

CROSS-REFERENCE TO RELATED APPLICATIONS

This application claims the benefit of U.S. Provisional Application 60/555,141 filed Mar. 22, 2004.

TECHNICAL FIELD

This invention relates to a transmission housing having a detachable end cover portion that selectively provides access to the components of a system without detaching the end cover portion from the main transmission housing.

BACKGROUND OF THE INVENTION

Vehicle transmissions, specifically planetary gear automatic power transmissions, typically have a park brake mechanism to resist the vehicle's natural tendency to roll down a sloped surface when the vehicle is in park. The contents of such a park brake generally include some sort of gear that is fixed with respect to the output shaft of the transmission and a pawl designed to selectively engage with the gear when the park brake is activated. The pawl substantially prevents the output shaft and attached gear from rotating when the pawl engages with the recesses between the gear teeth.

Vehicles with complex non-traditional powertrains, like electromechanical vehicles, still require a park brake mechanism. However, the alteration of some components in the transmission may require the park pawl and its complementary components to be altered as well. For example, some hybrid electromechanical transmissions require the use of two electric motors to supply power to the output shaft of the transmission.

SUMMARY OF THE INVENTION

The park brake may be relocated to the end portion of an electromechanical transmission to accommodate the second electric motor. Such an arrangement requires a cover to protect the park brake. The cover should be designed with a point of entry to the park brake for servicing. Therefore, the present invention provides an electromechanical transmission including a system located in a detachable end cover portion of the transmission housing. The end cover portion blankets the system while also defining an access opening that is large enough to provide access to the system without detaching the end cover portion. An access cover for the access opening is also included.

In one aspect of the present invention, the system is a park pawl system having a pawl, pawl return spring, and actuator guide.

In another aspect of the present invention, the access cover is formed of sheet metal by a stamping process.

In another aspect of the present invention, a controlled compression gasket is provided to further seal the access cover to the access opening.

In another aspect of the present invention, the end cover portion is die cast and a cast-in-place window forms the access opening.

More specifically, the present invention relates to a transmission including a system; a main transmission housing having a transmission opening and predetermined structural integrity; and a detachable end cover portion for substantially covering the transmission opening and configured to define a cavity for at least partially housing the system. The end cover portion has an access opening configured to enable access to the system for servicing the system without detaching the end cover portion from the transmission housing. Further included is an access cover for the access opening. Moreover, the end cover portion is configured to provide sufficient structural support to the main transmission housing when attached to the main transmission opening to maintain the predetermined structural integrity of the main transmission housing.

Another aspect of this invention includes a method of selectively providing access to a park pawl system located in the end cover portion of a transmission housing. The steps of the method include: providing a transmission housing with a detachable end cover portion which accommodates the park pawl system and defines an access opening configured to enable access to the park pawl system for assembly and service without detaching the end cover portion from the transmission housing; providing an access cover sufficient to cover the access opening when attached to the end cover portion of the transmission; and selectively detaching the access cover from the end cover portion to provide access to the park pawl system.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 1 is a side elevational view of an electromechanical transmission housing with end cover portion and with parts broken away to show the electrical motors in their respective housings;

FIG. 2 is an exploded perspective view of the end cover portion, park pawl system, access opening and access cover; and FIG. 3 is a perspective view of the park pawl system and relevant transmission components isolated from the main transmission housing and end cover portion.

DESCRIPTION OF THE PREFERRED EMBODIMENTS

Referring to the drawings, FIGS. 1 through 3, wherein like characters represent the same or corresponding parts throughout the several views, there is shown in FIG. 1 a schematic side elevational view of a hybrid electromechanical transmission 10. The transmission consists of a two-part housing: the main housing 12 and the end cover portion 14. In sum, the end cover portion 14 blankets a park pawl system 28 and defines an access opening 30 (as schematically represented in FIG. 1) that is large enough to provide access to the park pawl system 28 without detaching the end cover portion 14 from the main housing 12. An access cover 42, as shown in FIG. 2, for the access opening 30 is also included.

More specifically, the main housing 12 contains two electric motors (A and B), which have their respective housings (or modules) 16 and 18. Motors A and B are journaled onto the main shaft 20 of the transmission, which is selectively linked to the output shaft 22 of the transmission. The motors (A, B) operate to selectively engage with clutches (not shown) to rotate the main shaft 20 at variable speeds and indirectly rotate the output shaft 22. Electric motor B, as shown in FIG. 1, fits through the opening or orifice between the main housing 12 and the end cover portion 14 at transmission opening 24 before the end cover portion 14 of the transmission is attached to the main housing 12; and electric motor A, as shown in FIG. 1, fits through the orifice or opening of the main housing 12 at 26. The available packaging space in the main housing 12 of the transmission 10 is dominated by the drum housings (16 and 18) for the electric motors A and B, respectively (as shown in FIG. 1). Therefore other transmission systems may be rearranged to accommodate. Systems relocated to the rear of the transmission, such as the park pawl system 28, are at least partially housed by the end cover portion 14 of the transmission housing.

The end cover portion 14 defines an access opening 30 as shown in FIGS. 1 and 2. The access opening 30 is configured to provide sufficient access to the system components housed in the end cover portion 14 of the transmission as demonstrated by a hand 32 (shown in FIG. 2) movable in and out of the access opening 30. To provide access to a park pawl system 28 as shown in FIG. 1, the access opening 30 is approximately 41 mm in length and 120 mm in height. Lying substantially normal to the transmission opening 24, the access opening 30 provides direct access to a pawl 34, pawl pivot pin 36, actuator guide 38 and pawl return spring 40 as shown in FIG. 2. Access to these components without detaching the end cover portion 14 from the main housing 12 is ideal for assembly and servicing.

To protect the system, an access cover 42 is provided as shown in FIG. 2. The access cover 42 is large enough to cover the access opening 30. In the preferred embodiment, the access cover 42 is approximately 60 mm in length and 137 mm in height. The access cover 42 is mounted onto the end cover portion 14 by structural connectors 44. In the preferred embodiment, the access cover 42 is composed of a steel alloy and formed by stamping processes.

A controlled compression gasket 46 is provided between the access opening 30 and the access cover 42 to substantially prevent the leakage of any oil outside the end cover portion 14 and to prevent unwanted debris from entering the end cover portion 14. In the preferred embodiment, the controlled compression gasket 46 is hollowed to match the access opening 30 of the end cover portion 14. The controlled compression gasket 46 is composed of elastomer material, ethelene acrylic or a reasonable substitute, and molded over a mold support made of steel sheet metal. The steel support is additionally provided with ferritic compression limiting washers 50 defining complementary holes to accept the structural connectors 44 of the access cover 42. The elastomer material is molded in a fashion to conform under the compressive load provided by the connectors 44, forming a seal to both the end cover portion 14 and the access cover 42, which prevents any leakage of oil outside of the assembly and prevents introduction of debris into the assembly. The degree of conformance of the elastomer material under compressive load by the connectors 44 is controlled by the compression limiting washers 50. The elastomer material of the controlled compression gasket 46 and the compression limiting washers 50 are held in their desired shape and by the mold support.

The end cover portion 14 also provides structural support to the main housing 12 of the transmission 10 (shown in FIG. 1). The access opening 30 is small enough and appropriately placed so that the end cover portion 14 maintains the maximum structural integrity needed for the end cover portion 14 to function as a structural component for the main housing 12. The main housing 12 and end cover portion 14 see torsional loading from the repetitive revolutions of the electric motors (A and B), engine (not shown), clutches (not shown), and output shaft 22. The end cover portion 14 is configured to withstand the torsional loads, driveline loads, clutch piston loads, and park pawl loads of a 7800 pound vehicle, thereby providing sufficient structural support to the main housing 12 to preserve its structural integrity. To provide this support, the end cover portion 14 is designed to be a uniform structure, as better seen in FIG. 2, and is comprised of an enhanced aluminum alloy die casting Grade ANSI A380.0 or Grade ANSI 383.0. The uniform structure of the end cover portion 14 and use of this alloy provides the necessary structural support while also reducing the weight and material costs of the transmission 10.

Though the end cover portion 14 may be manufactured through a number of processes, in the preferred embodiment the end cover portion 14 is manufactured by die-casting. Generally, die-casting is compatible with the use of aluminum alloys. Additionally, die-casting generally also provides excellent dimensional accuracy and stability in high volume manufacturing. The end cover portion 14 has a complex geometry, as shown in FIG. 2, wherein die-casting configures contours to facilitate the park pawl system 28 and its complimentary components—shown in FIG. 2—while remaining compact enough to meet the aforementioned compact packaging requirements. The die (not shown) for the end cover portion 14 is designed with configurations to provide such contoured surfaces.

Finally, FIG. 3 details the park pawl system 28. An engagement gear 52 has a number of teeth 54 and tooth recesses 56 on its perimeter. On the inner diameter of the engagement gear 52 are a series of complementary splines 58 functioning to secure the engagement gear 52 directly onto a clutch housing 60 (as shown in FIG. 2) and indirectly onto the output shaft 22 (shown in FIG. 1). When the wheels of the vehicle rotate by external forces, such as gravity, the drive shaft also turns and causes the output shaft 22 and engagement gear 52 on the clutch housing 60 to rotate as the engagement gear 52 is configured to rotate with the output shaft 22.

With reference to FIG. 3, the park pawl system 28 consists of a pawl pin 36, torsion spring (or pawl return spring 40), pawl 34 and actuator guide 38. The pawl 34, actuator 62, and actuator guide 38 are placed in the end cover portion 14, situated to axially align the pawl 34 with the pawl engagement gear 52. The pawl 34 is configured to fit in the tooth recesses 56 on the engagement gear 52 perimeter upon activation of the park pawl system 28 (as shown at 64). The pawl 34 is mounted on the pawl pin 36, and is free to rotate or pivot about the pawl pin 36. A pawl return spring 40 operates to hold the pawl 34 in the disengaged position except when mechanically engaged. The pawl 34 is mounted adjacent to a slotted actuator guide 38 and actuator 62 so that upon transverse motion of the actuator 62 the pawl 34 is rotated or pivoted between the engaged and disengaged positions.

The actuator guide 38 encases the actuator 62 and is secured by a pin 66 (through aperture 68 shown in FIG. 2) with respect to the end cover portion 14. The end cover portion 14 is hollowed at pocket 70 to receive and accommodate the end shape of the actuator guide 38. Movement of the actuator 62 aft causes the cam portion 72 and wide portion 74 of the actuator 38, shown in FIG. 3, to collide with the back 76 of the pawl 34 and force the pawl 34 to rotate or pivot into engagement with a tooth recess 56 in the engagement gear 52. Movement of the actuator 62 forward with respect to the pawl 34 moves the cam portion 72 away from the back 76 of the pawl 34 to remove the force of the cam, whereby to release the pawl 34 from the tooth recess 56. When the pawl 34 is released from the tooth recesses 56, the pawl return spring 40 rotates the pawl 34 into the disengaged position allowing the engagement gear 52 to freely rotate.

The actuator 62 is spring mounted to an end portion 78 of the connecting rod 80. The axially positioned linear spring (or actuator return spring 82) functions to enable shift selection of park regardless of the position of pawl 34 relative to the engagement gear 52, teeth 54 and tooth recesses 56. With reference to FIGS. 1 and 3 the connecting rod 80 is secured to the detent lever 84 of the shift selector 85 at 86. The detent lever 84 is pivotably secured with respect to the main housing 12 of the transmission at 88, where the selector shaft lever (not shown) is also connected. The perimeter of the detent lever 84 has detents 90 on its lower end. The detents 90 are configured to engage with the cylindrical end 92 of a detent retention spring 94. The detent retention spring 94 is indirectly mounted with respect to the main housing 12 of the transmission so that upon placing the vehicle in park the selector shaft lever rotates the detent lever 84 and the cylindrical end 92 of the detent retention spring 94 engages with the most aft detent 96 of the detent lever 84 to secure it in place. To reach this position the detent lever 84 rotates clockwise, or rearward with respect to the main housing 12 moving the connecting rod 80 rearward or toward the end cover portion 14 of the transmission 10.

The access opening 30, as shown in FIGS. 1 and 2, is designed to provide access to the rear mounted components of the park pawl system (34, 36, 38 and 40) as detailed above.

While the best modes for carrying out the invention have been described in detail, those familiar with the art to which this invention relates will recognize various alternative designs and embodiments for practicing the invention within the scope of the appended claims.

The invention claimed is:

1. An electro-mechanical transmission including a system, comprising:
    a main transmission housing having a transmission opening;
    a detachable end cover portion for substantially covering said transmission opening and configured to define a cavity for at least partially housing the system;
    said end cover portion having an access opening configured to enable access to the system for servicing the system without detaching said end cover portion from said transmission housing; and
    an access cover for said access opening;
    wherein said end cover portion is configured to provide sufficient structural support to said main transmission housing when attached to said transmission opening so as to maintain the structural integrity of said main transmission housing.

2. The electro-mechanical transmission of claim 1, wherein said system is a park pawl system;
    wherein said cavity of said end cover portion is further configured sufficiently large to allow sufficient access to said cavity for servicing said park pawl system without detaching said end cover portion from said transmission housing.

3. The electro-mechanical transmission of claim 2, wherein said park pawl system includes a pawl, a pawl return spring, and actuator guide housed in said cavity of said end cover portion.

4. The electro-mechanical transmission of claim 1, wherein said access cover is formed of sheet metal attachable to said end cover portion to close said access opening.

5. The electro-mechanical transmission of claim 4, wherein said formed sheet metal cover is formed by a stamping process.

6. The electro-mechanical transmission of claim 4, further comprising:
    a seal for said access cover at said access opening.

7. The electro-mechanical transmission of claim 6, wherein said seal is a controlled compression gasket lining said access opening and operative to significantly seal said cavity of said end cover portion at said formed sheet metal cover.

8. The electro-mechanical transmission of claim 6, wherein said seal for said access cover at said access opening is made of elastomer material and molded over a steel metal support.

9. The electro-mechanical transmission of claim 6, further comprising:
    a structural connector by which said seal is selectively securable to said end cover portion; and
    a compression limiting washer defining a complementary hole to accept said structural connectors.

10. The electro-mechanical transmission of claim 9, wherein said compression limiting washer is composed of a ferritic material.

11. The electro-mechanical transmission of claim 1, wherein said end cover potion is die cast and said access opening is defined by a cast-in-place window in said cavity for said end cover portion.

12. The electro-mechanical transmission of claim 1, wherein said end cover portion of said transmission is die cast to define a cast-in-place window substantially normal to said transmission opening when said end cover is attached to said transmission housing.

13. An electro-mechanical transmission including a multi-part park pawl system, comprising:
    a main transmission housing having a transmission opening;
    a detachable end cover portion for substantially covering said transmission opening and configured to define a cavity for at least partially housing the park pawl system;
    said end cover having an access opening configured to enable sufficient access to one of the parts of the park pawl system for assembling and servicing said one of the parts of the park pawl system without detaching said end cover portion from said transmission housing;
    a formed sheet metal cover attachable to said end cover portion to close said access opening;
    a controlled compression gasket covering said access opening, operative to significantly seal said cavity of said end cover portion at said formed sheet metal cover; and
    wherein said end cover portion is configured as a structural component for said main transmission housing so as to provide sufficient structural support to said main transmission housing so as to maintain the structural integrity of said main transmission housing.

14. A method of selectively providing access to a park pawl system located in the end cover portion of an electro-mechanical transmission housing:

providing a transmission housing with a detachable end cover portion accommodating the park pawl system;

wherein said end cover portion defines an access opening configured to enable access to the park pawl system for one of said assembly and service without detaching said end cover portion from said transmission housing;

providing a access cover sufficient to cover said access opening when attached to said end cover portion of said transmission; and selectively detaching said access cover from said end cover portion to provide access to said park pawl system.

15. The method of claim 14, wherein said cover is formed of sheet metal.

16. The method of claim 15, further comprising:

providing a controlled compression gasket to seal said end cover portion at said access cover for said access opening.

17. The method of claim 16, further comprising:

providing a structural connector by which said controlled compression gasket is selectively securable to said end cover portion; and providing a compression limiting washer defining a complementary hole to accept said structural connectors; wherein said compression limiting washer is composed of a ferritic material.

* * * * *